United States Patent
Wu

(10) Patent No.: US 8,069,573 B2
(45) Date of Patent: Dec. 6, 2011

(54) PRUNING HOOK WITH TWO OPERATION MODES

(75) Inventor: Shih-Piao Wu, Changhua Hsien (TW)

(73) Assignee: Jiin Haur Industrial Co., Ltd., Changhua Hsien (TW)

( * ) Notice: Subject to any disclaimer, the term of this patent is extended or adjusted under 35 U.S.C. 154(b) by 255 days.

(21) Appl. No.: 12/506,425

(22) Filed: Jul. 21, 2009

(65) Prior Publication Data

US 2011/0016730 A1  Jan. 27, 2011

(51) Int. Cl.
*B26B 13/26* (2006.01)
(52) U.S. Cl. .......................................... 30/249; 30/245
(58) Field of Classification Search .................. 30/245, 30/246, 249, 296.1
See application file for complete search history.

(56) References Cited

U.S. PATENT DOCUMENTS

| | | | | |
|---|---|---|---|---|
| 2,593,323 A * | 4/1952 | Magnussen et al. | ............. | 30/512 |
| 2,744,322 A * | 5/1956 | Gustafson | ...................... | 30/249 |
| 3,715,805 A * | 2/1973 | Fraser | .......................... | 30/166.3 |
| 5,933,965 A * | 8/1999 | Linden et al. | .................... | 30/249 |
| 5,950,315 A * | 9/1999 | Linden | ............................. | 30/249 |
| 6,178,644 B1 * | 1/2001 | Le et al. | ........................... | 30/249 |
| 6,345,445 B1 * | 2/2002 | Schofield | ......................... | 30/249 |
| 7,658,011 B2 * | 2/2010 | Shan | ................................ | 30/249 |
| 2010/0192385 A1 * | 8/2010 | Pittau | .............................. | 30/249 |
| 2010/0299938 A1 * | 12/2010 | Wu | ................................. | 30/249 |
| 2010/0299939 A1 * | 12/2010 | Wu | ................................. | 30/249 |
| 2011/0016730 A1 * | 1/2011 | Wu | ................................. | 30/249 |
| 2011/0107606 A1 * | 5/2011 | Shan | ................................ | 30/249 |
| 2011/0113635 A1 * | 5/2011 | Lee et al. | ......................... | 30/194 |

* cited by examiner

*Primary Examiner* — Hwei C Payer
(74) *Attorney, Agent, or Firm* — Alan Kamrath; Kamrath & Associates PA

(57) ABSTRACT

A pruning hook includes an extension shank (30), a blade unit (10) including a fixed blade (12) mounted on the extension shank and a movable blade (13) pivotally connected with the fixed blade, a driving cord (15) connected with the movable blade, a slide (16) connected with the driving cord, a pull cord (20) connected with the slide, a control member (40) movably mounted on the extension shank and connected with a first end (21) of the pull cord, and a pulling member (50) movable relative to the extension shank and connected with a second end (22) of the pull cord. Thus, the blade unit is driven by the control member or the pulling member so that the blade unit has two operation modes to facilitate a user operating the pruning hook to perform a cutting action.

17 Claims, 7 Drawing Sheets

PRUNING HOOK WITH TWO OPERATION MODES

BACKGROUND OF THE INVENTION

1. Field of the Invention

The present invention relates to a shearing tool and, more particularly, to a pruning hook for a gardening purpose to shear branches or leaves at a higher location.

2. Description of the Related Art

A conventional pruning hook in accordance with the prior art shown in FIG. 7 comprises an extension shank 60, a blade unit 70 mounted on a front end of the extension shank 30, a driving unit 80 mounted on a rear end of the extension shank 30, an elastic member 83 mounted on the driving unit 80, and a linkage 61 connected between the blade unit 70 and the driving unit 80. The blade unit 70 includes a fixed blade 71 mounted on the front end of the extension shank 60 and a movable blade 72 pivotally connected with and movable relative to the fixed blade 71. The driving unit 80 includes a fixed handle 81 mounted on the rear end of the extension shank 60 and a movable handle 82 pivotally connected with and movable relative to the fixed handle 81. The elastic member 83 is biased between the fixed handle 81 and the movable handle 82.

In operation, when the driving unit 80 is pressed by a user's hand, the driving unit 80 is operated to drive the linkage 61 which drives the blade unit 70 so as to perform a cutting action. On the contrary, when the pressing force applied on the driving unit 80 disappears, the driving unit 80 is driven by the restoring force of the elastic member 83 to open the blade unit 70 so that the blade unit 70 is opened at a normal state by the elastic force of the elastic member 83.

However, the driving unit 80 is driven by a pressing force applied by the user's hand to drive the blade unit 70 so that the blade unit 70 has a smaller shearing force to perform the cutting action and cannot cut a larger object easily. In addition, the user's hand needs to press the driving unit 80 successively so as to drive the blade unit 70, thereby easily causing pain or an uncomfortable sensation to the user. Further, the linkage 61 is connected between the blade unit 70 and the driving unit 80 to directly transmit the force from the driving unit 80 to the blade unit 70, so that the blade unit 70 is not operated in an energy-saving manner.

BRIEF SUMMARY OF THE INVENTION

The primary objective of the present invention is to provide a pruning hook with two operation modes.

Another objective of the present invention is to provide a pruning hook having an energy-saving function.

A further objective of the present invention is to provide a pruning hook, wherein the blade unit is driven by the control member or the pulling member so that the blade unit has two operation modes to facilitate a user operating the pruning hook to perform a cutting action.

A further objective of the present invention is to provide a pruning hook, wherein when the pruning hook is operated at a shorter distance, the user can drive the control member to perform the cutting action, and when the pruning hook is operated at a longer distance, the user can drive the pulling member to perform the cutting action, so that the pruning hook is operated by the user in an energy-saving manner so as to facilitate the user performing the cutting action.

A further objective of the present invention is to provide a pruning hook, wherein the pulling member is pulled by the user's arm to drive the blade unit so that the blade unit is driven by a greater force applied by the user's arm and has a larger shearing force to perform the cutting action in an easier manner so as to cut a larger object easily and conveniently.

A further objective of the present invention is to provide a pruning hook, wherein the pulling member is pulled by the user's arm so that the user needs not to perform the cutting action by a frequent pressing of his hand so as to provide a comfortable sensation to the user.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
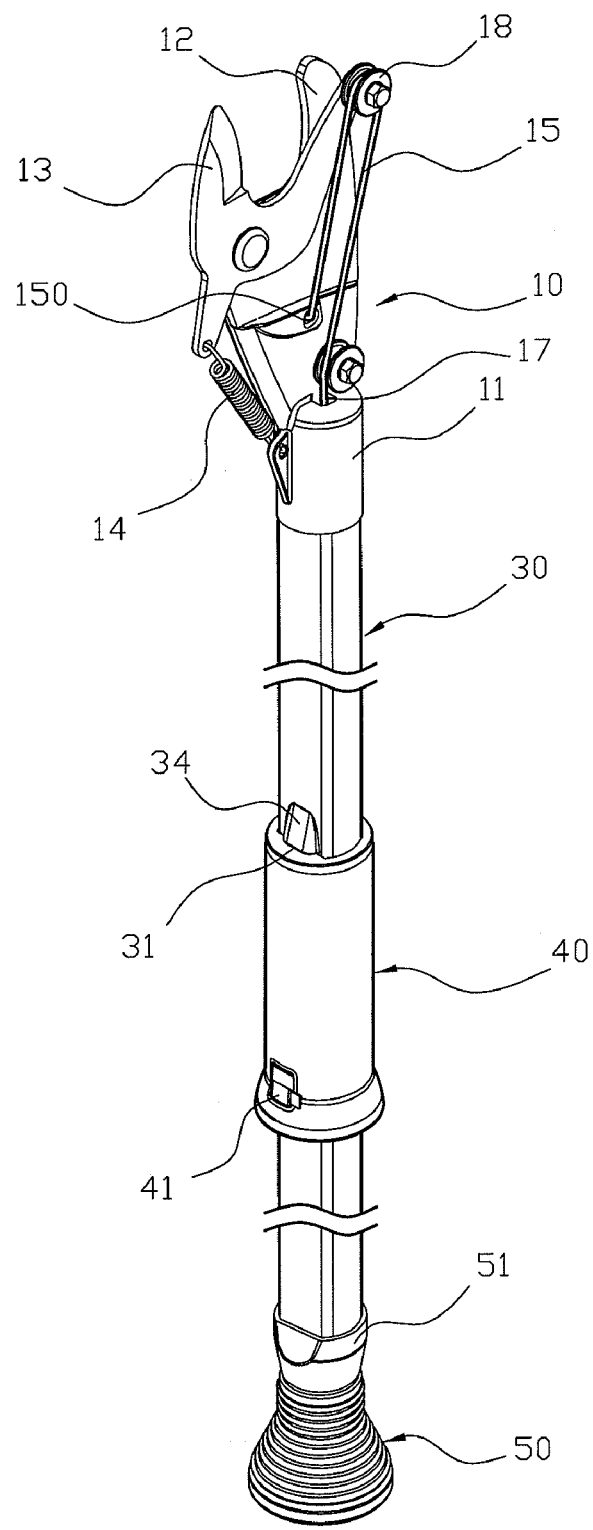
FIG. 1 is a perspective view of a pruning hook in accordance with the preferred embodiment of the present invention.
Figure 2:
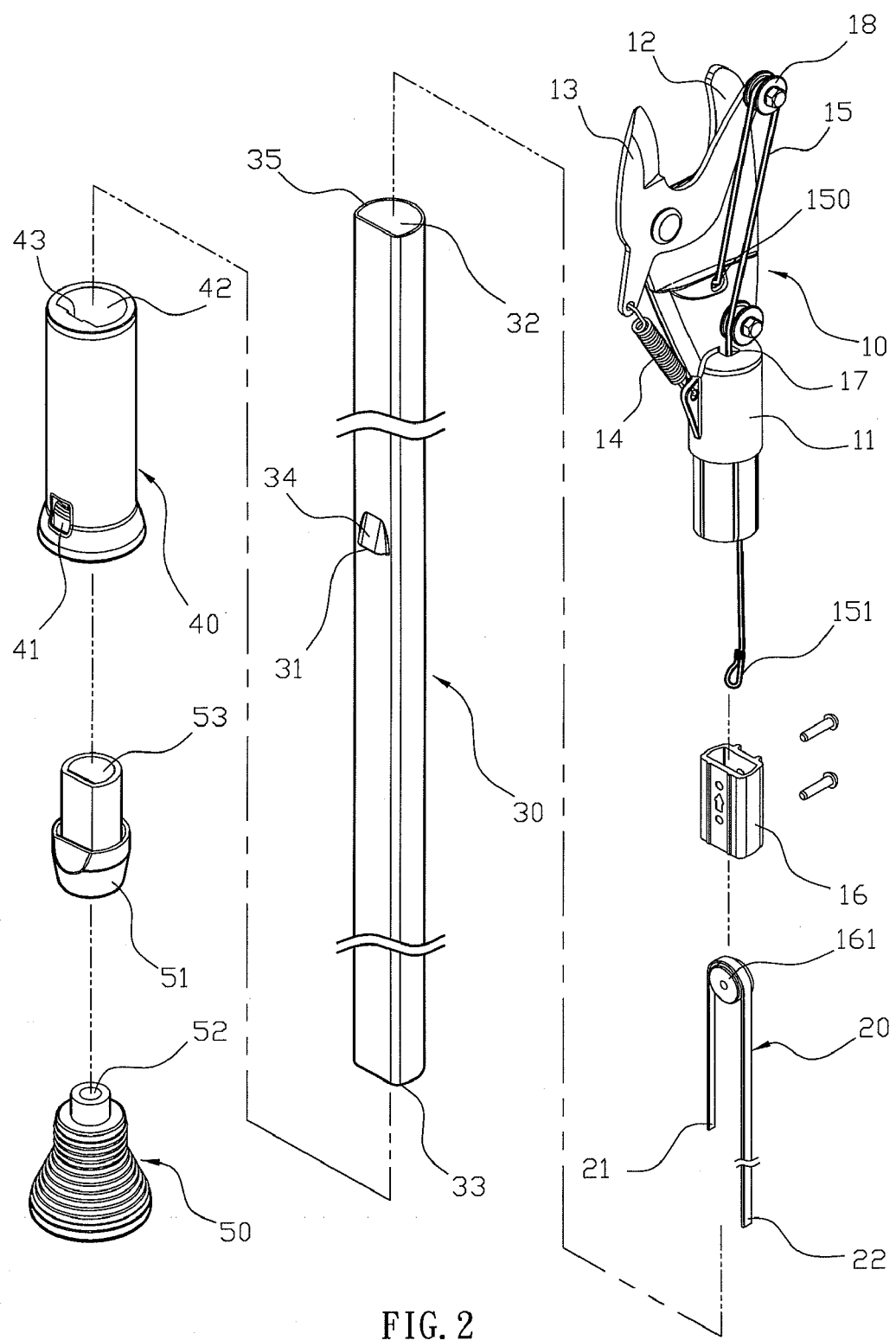
FIG. 2 is an exploded perspective view of the pruning hook as shown in FIG. 1.
Figure 3:
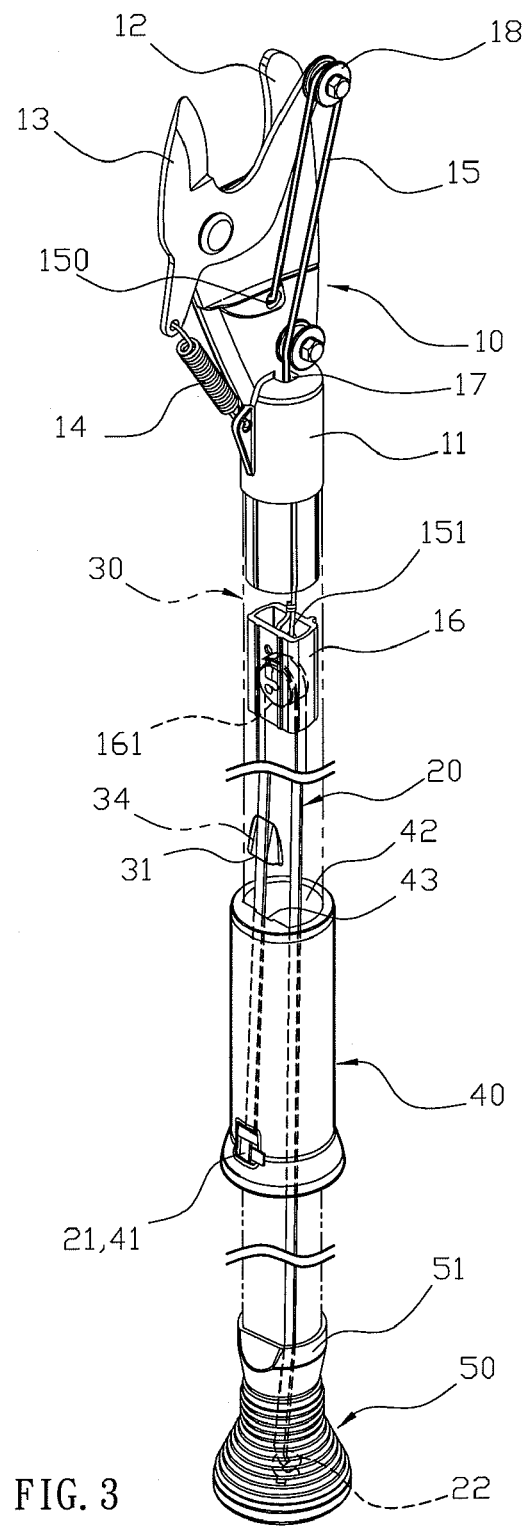
FIG. 3 is a perspective broken view of the pruning hook as shown in FIG. 1.

Referring to the drawings and initially to FIGS. 1-4, a pruning hook in accordance with the preferred embodiment of the present invention comprises an extension shank 30, a blade unit 10 including a fixed blade 12 mounted on a first end 35 of the extension shank 30 and a movable blade 13 pivotally connected with and movable relative to the fixed blade 12, a driving cord 15 connected with the movable blade 13 of the blade unit 10 to drive the movable blade 13 of the blade unit 10 to move relative to the fixed blade 12 of the blade unit 10, a slide 16 movably mounted in the extension shank 30 and connected with the driving cord 15 to drive and move the driving cord 15, a pull cord 20 mounted in the extension shank 30 and connected with the slide 16 to drive and move the slide 16, a control member 40 movably mounted on the extension shank 30 and connected with a first end 21 of the pull cord 20 to drive and move the pull cord 20, and a pulling member 50 movable relative to a second end 33 of the extension shank 30 and connected with a second end 22 of the pull cord 20 to drive and move the pull cord 20.

The extension shank 30 is a hollow body and has a substantially semi-circular cross-sectional profile. The extension shank 30 has an inner portion provided with a receiving chamber 32 to receive the driving cord 15, the slide 16 and the pull cord 20. The extension shank 30 has a side provided with a protruding stop block 34. The stop block 34 of the extension shank 30 has an inner portion provided with a passage 31 connected to the receiving chamber 32 of the extension shank 30 to allow passage of the pull cord 20. The stop block 34 of the extension shank 30 is spaced from the pulling member 50 and is located between the pulling member 50 and the blade unit 10. The slide 16 is a hollow body. A control pulley 161 is rotatably mounted in the slide 16.

The pull cord 20 is partially received in the slide 16 and is pivotally mounted on the control pulley 161 to drive and move the control pulley 161 and the slide 16 relative to the extension shank 30. The pull cord 20 has a flat shape and is hidden in the receiving chamber 32 of the extension shank 30. The first end 21 of the pull cord 20 extends outwardly from the extension shank 30 and is secured in the control member 40 to move in concert with the control member 40. The first end 21 of the pull cord 20 passes through and protrudes outwardly from the passage 31 of the stop block 34. The second end 22 of the pull cord 20 is secured in the pulling member 50 to move in concert with the pulling member 50.

The control member 40 has an inner portion provided with a slideway 42 slidably mounted on the extension shank 30. The slideway 42 of the control member 40 has a substantially semi-circular cross-sectional profile and has a sidewall provided with a receiving channel 43 to allow passage of the pull cord 20. The receiving channel 43 of the control member 40 extends in a longitudinal direction of the control member 40. The control member 40 has a periphery provided with a fixing portion 41 connected to the receiving channel 43 to fix the first end 21 of the pull cord 20 so that the first end 21 of the pull cord 20 is secured on the control member 40. The control member 40 is disposed between the stop block 34 of the extension shank 30 and the second end 33 of the extension shank 30. The control member 40 is located outside of the extension shank 30 and is movable on the extension shank 30 to abut the stop block 34 of the extension shank 30 so that the stop block 34 of the extension shank 30 can limit a further movement of the control member 40.

The fixed blade 12 of the blade unit 10 has an end portion provided with a mounting tube 11 mounted on the first end 35 of the extension shank 30. The mounting tube 11 of the blade unit 10 has an inner portion provided with a connecting hole 17 connected to the receiving chamber 32 of the extension shank 30 to allow passage of the driving cord 15. The blade unit 10 further includes a guide pulley 18 rotatably mounted on a first end of the movable blade 13, and an elastic member 14 biased between a second end of the movable blade 13 and the fixed blade 12 to drive the movable blade 13 to move outwardly relative to the fixed blade 12.

The driving cord 15 is pivotally mounted on the guide pulley 18 of the blade unit 10 to drive the movable blade 13 of the blade unit 10 to move toward the fixed blade 12 of the blade unit 10. The driving cord 15 extends through the connecting hole 17 of the mounting tube 11 into the receiving chamber 32 of the extension shank 30. The driving cord 15 has a first end 150 secured on the fixed blade 12 of the blade unit 10 and a second end 151 secured in the slide 16 to move in concert with the slide 16. The driving cord 15 co-operates with the pull cord 20 to function as a driving mechanism to drive the blade unit 10.

The pruning hook further comprises a fixing seat 51 secured on the second end 33 of the extension shank 30. The fixing seat 51 is located between the extension shank 30 and the pulling member 50. The fixing seat 51 has a substantially semi-circular cross-sectional profile and has an inner portion provided with a passageway 53 to allow passage of the second end 22 of the pull cord 20. The fixing seat 51 has a first end inserted into the receiving chamber 32 of the extension shank 30 and a second end protruding outwardly from the second end 33 of the extension shank 30.

The pulling member 50 is detachably mounted on and movable relative to the fixing seat 51. The pulling member 50 protrudes outwardly from the fixing seat 51 and the second end 33 of the extension shank 30. The pulling member 50 has an inner portion provided with a fixing hole 52 to fix the second end 22 of the pull cord 20 so that the second end 22 of the pull cord 20 is secured on the pulling member 50.

Figure 4:
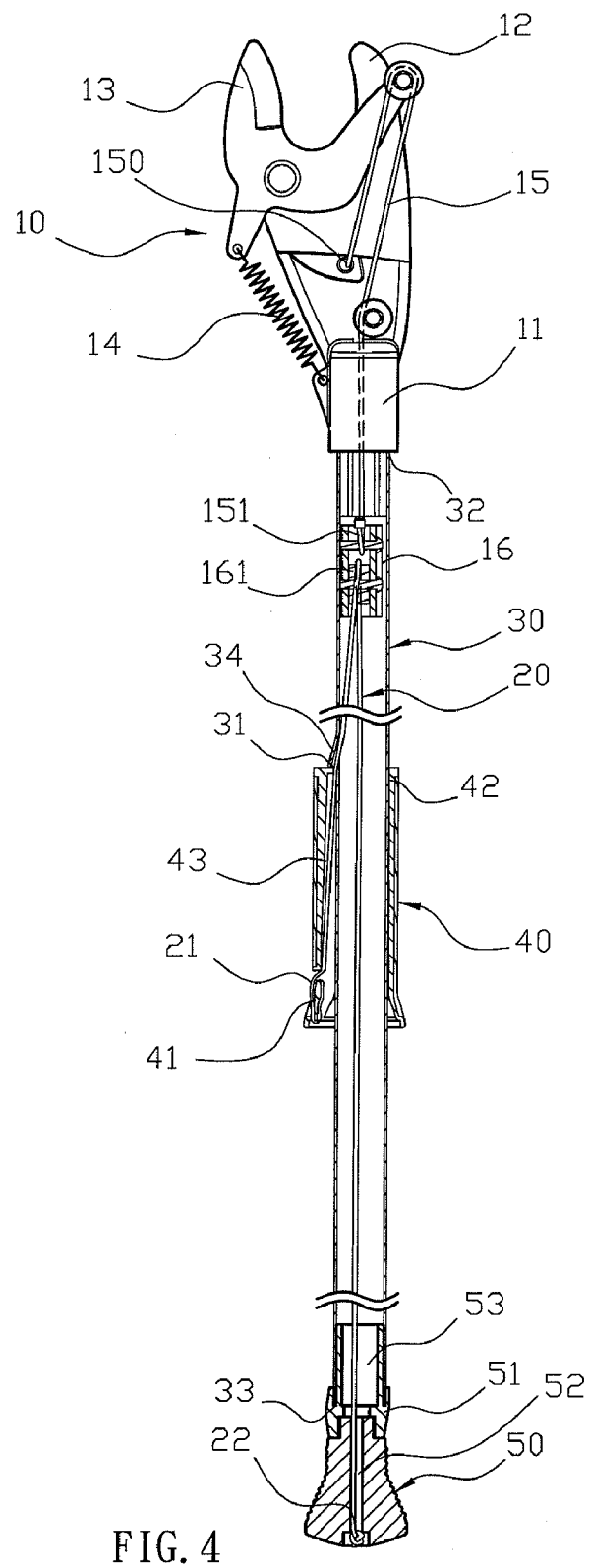
FIG. 4 is a side cross-sectional view of the pruning hook as shown in FIG. 1.
Figure 5:
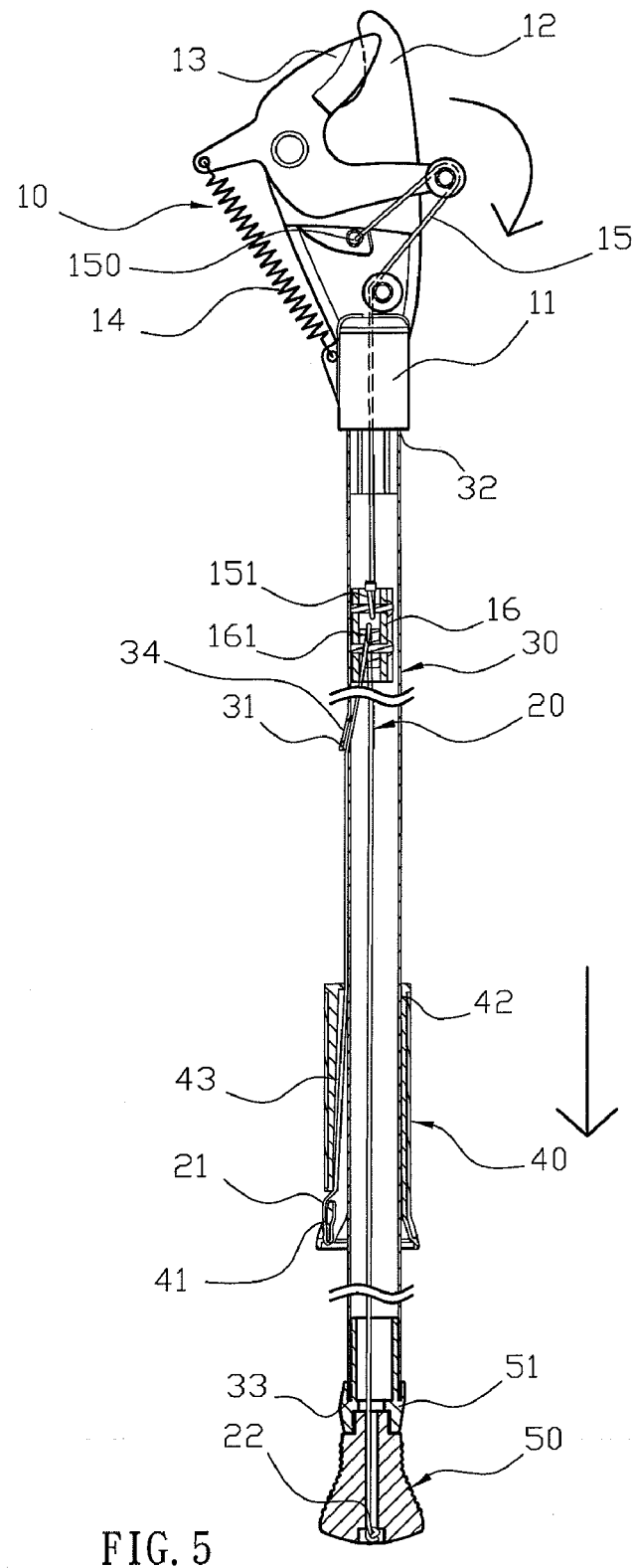
FIG. 5 is a schematic operational view of the pruning hook as shown in FIG. 4 in use.

In operation, referring to FIG. 5 with reference to FIGS. 1-4, when the control member 40 is driven by a user to overcome the elastic force of the elastic member 33 and to move outwardly relative to the blade unit 10, the pull cord 20 is driven by the control member 40 to move the control pulley 161 which moves the slide 16 which moves the driving cord 15 which moves the guide pulley 18 which drives the movable blade 13 of the blade unit 10 to move toward the fixed blade 12 of the blade unit 10 as shown in FIG. 5 so as to perform a cutting action. On the contrary, when the pulling force applied on the control member 40 disappears, the movable blade 13 of the blade unit 10 is driven by the restoring force of the elastic member 14 to move outwardly relative to the fixed blade 12 of the blade unit 10 as shown in FIG. 4 so that the blade unit 10 is opened at a normal state. At this time, the control member 40 is moved toward the blade unit 10 to abut the stop block 34 which limits a further movement of the control member 40.

Figure 6:
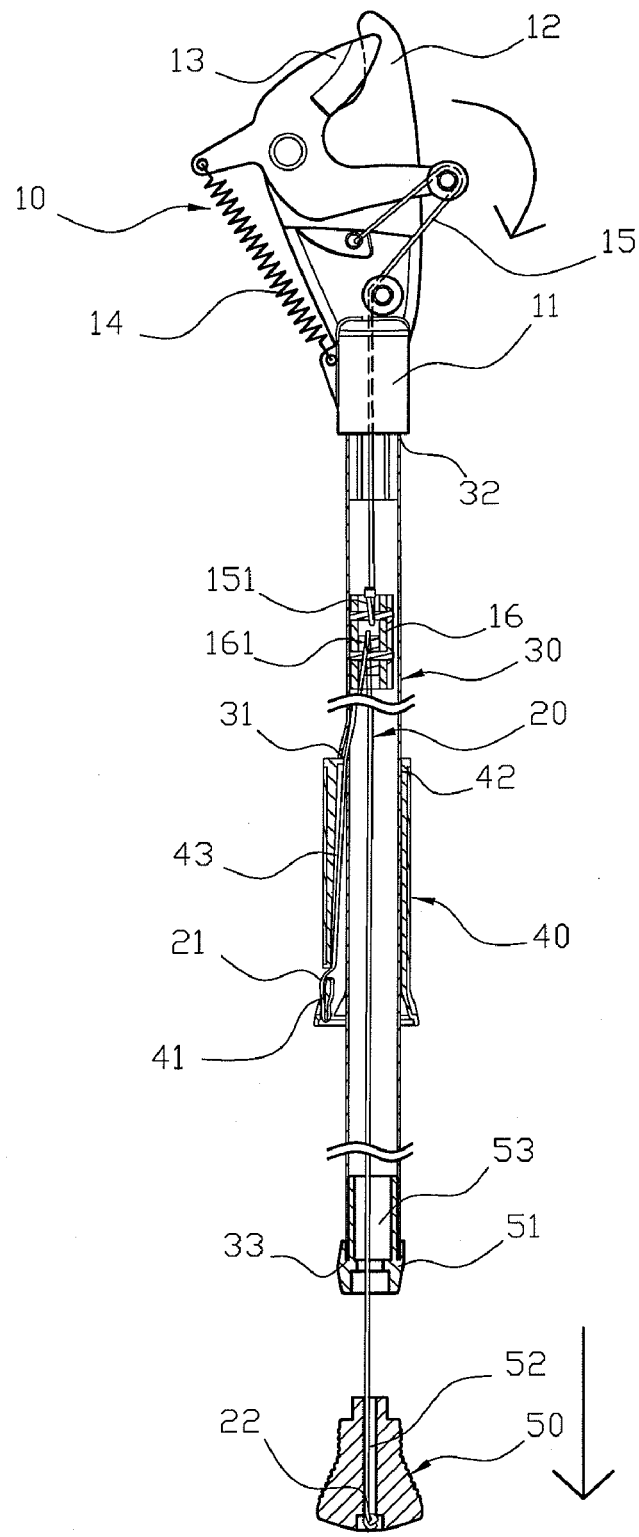
FIG. 6 is a schematic operational view of the pruning hook as shown in FIG. 4 in use.
Figure 7:
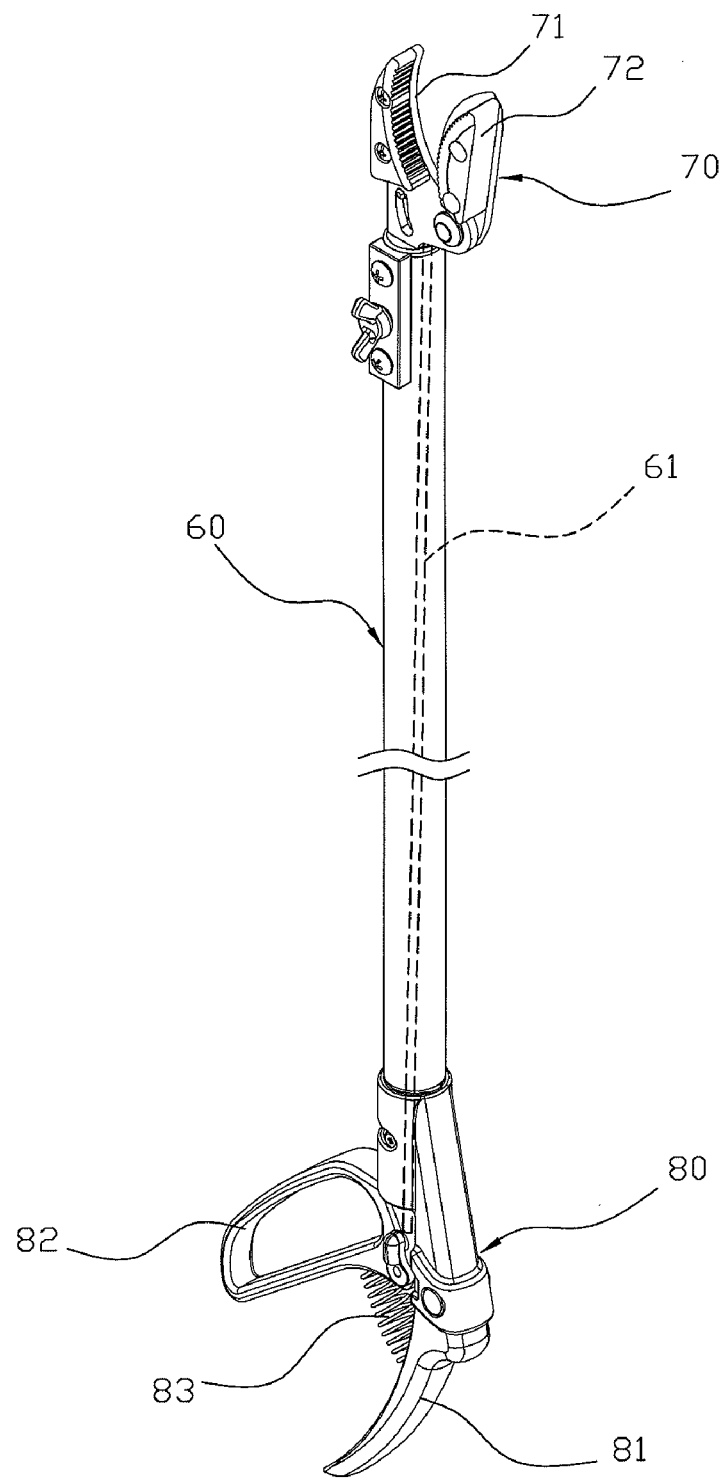
FIG. 7 is a perspective view of a conventional pruning hook in accordance with the prior art.

Alternatively, referring to FIG. 6 with reference to FIGS. 1-4, when the pulling member 50 is pulled by a user to overcome the elastic force of the elastic member 14 and to move outwardly relative to the blade unit 10, the pull cord 20 is driven by the pulling member 50 to move the control pulley 161 which moves the slide 16 which moves the driving cord 15 which moves the guide pulley 18 which drives the movable blade 13 of the blade unit 10 to move toward the fixed blade 12 of the blade unit 10 as shown in FIG. 6 so as to perform a cutting action. On the contrary, when the pulling force applied on the pulling member 50 disappears, the movable blade 13 of the blade unit 10 is driven by the restoring force of the elastic member 14 to move outwardly relative to the fixed blade 12 of the blade unit 10 as shown in FIG. 4 so that the blade unit 10 is opened at a normal state. At this time, the pulling member 50 is moved toward the extension shank 30 to abut the fixing seat 51 which stops and limits a further movement of the pulling member 50.

Accordingly, the blade unit 10 is driven by the control member 40 or the pulling member 50 so that the blade unit 10 has two operation modes to facilitate a user operating the pruning hook to perform a cutting action. In addition, when the pruning hook is operated at a shorter distance, the user can drive the control member 40 to perform the cutting action, and when the pruning hook is operated at a longer distance, the user can drive the pulling member 50 to perform the cutting action, so that the pruning hook is operated by the user in an energy-saving manner so as to facilitate the user performing the cutting action. Further, the pulling member 50 is pulled by the user's arm to drive the blade unit 10 so that the blade unit 10 is driven by a greater force applied by the user's arm and has a larger shearing force to perform the cutting action in an easier manner so as to cut a larger object easily and conveniently. Further, the pulling member 50 is pulled by the user's arm so that the user needs not to perform the cutting action by a frequent pressing of his hand so as to provide a comfortable sensation to the user.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A pruning hook, comprising:
an extension shank (30);

a blade unit (10) including a fixed blade (12) mounted on a first end (35) of the extension shank and a movable blade (13) pivotally connected with and movable relative to the fixed blade;

a driving cord (15) connected with the movable blade of the blade unit to drive the movable blade of the blade unit to move relative to the fixed blade of the blade unit;

a slide (16) movably mounted in the extension shank and connected with the driving cord to drive and move the driving cord;

a pull cord (20) mounted in the extension shank and connected with the slide to drive and move the slide;

a control member (40) movably mounted on the extension shank and connected with a first end (21) of the pull cord to drive and move the pull cord;

a pulling member (50) movable relative to a second end (33) of the extension shank and connected with a second end (22) of the pull cord to drive and move the pull cord;

wherein the extension shank has a side provided with a protruding stop block, (34);

the control member is movable on the extension shank to abut the stop block of the extension shank;

the extension shank has an inner portion provided with a receiving chamber to receive the driving cord, the slide and the pull cord;

the stop block of the extension shank has an inner portion provided with a passage connected to the receiving chamber of the extension shank to allow passage of the pull cord;

the first end of the pull cord extends outwardly from the extension shank and is secured in the control member to move in concert with the control member;

the first end of the pull cord passes through and protrudes outwardly from the passage of the stop block.

2. The pruning hook of claim 1, wherein
the pruning hook further comprises a control pulley (161) rotatably mounted in the slide;
the pull cord is pivotally mounted on the control pulley to drive and move the control pulley and the slide relative to the extension shank.

3. The pruning hook of claim 1, wherein the control member has a periphery provided with a fixing portion (41) to fix the first end of the pull cord so that the first end of the pull cord is secured on the control member.

4. The pruning hook of claim 1, wherein
the pruning hook further comprises a fixing seat (51) secured on the second end of the extension shank;
the pulling member is detachably mounted on and movable relative to the fixing seat.

5. The pruning hook of claim 4, wherein
the stop block of the extension shank is spaced from the pulling member and is located between the pulling member and the blade unit;
the control member is disposed between the stop block of the extension shank and the second end of the extension shank;
the fixing seat is located between the extension shank and the pulling member.

6. The pruning hook of claim 1, wherein the pull cord has a flat shape.

7. The pruning hook of claim 1, wherein the control member has an inner portion provided with a slideway (42) slidably mounted on the extension shank.

8. The pruning hook of claim 7, wherein the slideway of the control member has a sidewall provided with a receiving channel (43) to allow passage of the pull cord.

9. The pruning hook of claim 8, wherein the receiving channel of the control member extends in a longitudinal direction of the control member.

10. The pruning hook of claim 7, wherein
the extension shank is a hollow body and has a substantially semi-circular cross-sectional profile;
the control member is located outside of the extension shank;
the slideway of the control member has a substantially semi-circular cross-sectional profile.

11. The pruning hook of claim 1, wherein
the blade unit further includes:
a guide pulley rotatably mounted on a first end of the movable blade;
an elastic member biased between a second end of the movable blade and the fixed blade to drive the movable blade to move outwardly relative to the fixed blade;
the driving cord is pivotally mounted on the guide pulley of the blade unit to drive the movable blade of the blade unit to move toward the fixed blade of the blade unit.

12. The pruning hook of claim 11, wherein the driving cord has a first end secured on the fixed blade of the blade unit and a second end secured in the slide to move in concert with the slide.

13. The pruning hook of claim 1, wherein the fixed blade of the blade unit has an end portion provided with a mounting tube mounted on the first end of the extension shank.

14. The pruning hook of claim 13, wherein
the mounting tube of the blade unit has an inner portion provided with a connecting hole connected to the receiving chamber of the extension shank to allow passage of the driving cord;
the driving cord extends through the connecting hole of the mounting tube into the receiving chamber of the extension shank.

15. The pruning hook of claim 1, wherein
the slide is a hollow body;
the pull cord is partially received in the slide;
the pull cord is hidden in the receiving chamber of the extension shank.

16. The pruning hook of claim 1, wherein
a fixing seat is secured on the second end of the extension shank and has a first end inserted into the receiving chamber of the extension shank and a second end protruding outwardly from the second end of the extension shank;
the pulling member protrudes outwardly from the fixing seat and the second end of the extension shank.

17. The pruning hook of claim 1, wherein
the second end of the pull cord is secured in the pulling member to move in concert with the pulling member;
a fixing seat is secured on the second end of the extension shank and has an inner portion provided with a passageway to allow passage of the second end of the pull cord;
the pulling member has an inner portion provided with a fixing hole to fix the second end of the pull cord so that the second end of the pull cord is secured on the pulling member.

* * * * *